US007809022B2

(12) United States Patent  (10) Patent No.: US 7,809,022 B2
Klish, II et al.  (45) Date of Patent: Oct. 5, 2010

(54) MAPPING SIX (6) EIGHT (8) MBIT/S SIGNALS TO A SONET FRAME

(75) Inventors: Cypryan T. Klish, II, Melbourne, FL (US); Donna O'Malley, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 378 days.

(21) Appl. No.: 11/551,809

(22) Filed: Oct. 23, 2006

(65) Prior Publication Data

US 2008/0095194 A1  Apr. 24, 2008

(51) Int. Cl.
 *H04J 3/00* (2006.01)
(52) U.S. Cl. .................. 370/476; 370/528; 370/538
(58) Field of Classification Search ........... 370/476, 370/395.51, 528
 See application file for complete search history.

(56) References Cited

U.S. PATENT DOCUMENTS

| 4,893,306 | A | | 1/1990 | Chao et al. |
| 5,267,236 | A | | 11/1993 | Stephenson, Jr. |
| 5,544,172 | A | * | 8/1996 | Abbas ................ 370/505 |
| 6,009,076 | A | | 12/1999 | Takatsu et al. |
| 6,014,708 | A | | 1/2000 | Klish |
| 6,654,802 | B1 | | 11/2003 | Oliva et al. |
| 6,697,386 | B2 | | 2/2004 | Sugawara et al. |
| 6,731,876 | B1 | * | 5/2004 | Okamoto et al. ........ 398/75 |
| 6,816,509 | B2 | | 11/2004 | Pelley et al. |
| 6,856,620 | B1 | | 2/2005 | Dunsmore et al. |
| 6,895,018 | B1 | * | 5/2005 | Klish, II ............... 370/471 |

| 6,993,046 | B1 | 1/2006 | Hernandez-Valencia et al. |

(Continued)

FOREIGN PATENT DOCUMENTS

EP  0 468 818  1/1992

(Continued)

OTHER PUBLICATIONS

Akcay, A.R., "Some Proposals for New Transport Technology in Bisdn" Proceedings of the Bilkent International Conference of New Trends on Communication, Control and Signal Processing, Amsterdam, NL. vol. 1, Jul. 2, 1990, pp. 1-7.

(Continued)

*Primary Examiner*—Huy D Vu
*Assistant Examiner*—Benjamin Lamont
(74) *Attorney, Agent, or Firm*—Fox Rothschild, LLP; Robert J. Sacco

(57) ABSTRACT

A system (104) is provided for filling a SONET SPE (204, 300, 500, 600, 700) with bytes of digital information. The system is comprised of data input ports (1-6) configured to receive payload signals comprised of payload information. The system is also comprised of data processing circuits configured to transfer bytes of payload information in sequence from the payload signals. The data processing circuits are also configured to break the payload information into byte segments. The data processing circuits are further configured to map the byte segments to the SONET SPE in a byte by byte manner. The SONET SPE is comprised of cells. The cells are filled from top to bottom in a manner proceeding row by row, from left to right in each row. A method for filling the SONET SPE with bytes of digital information corresponding to payload signals is also provided.

30 Claims, 9 Drawing Sheets

U.S. PATENT DOCUMENTS

| | | |
|---|---|---|
| 6,993,047 B1 | 1/2006 | Nigam et al. |
| 7,002,986 B1 | 2/2006 | Roberts |
| 7,075,952 B1 | 7/2006 | Torma et al. |
| 7,158,721 B2 * | 1/2007 | Mantin et al. .................. 398/25 |
| 7,161,961 B2 * | 1/2007 | Barker et al. ................ 370/476 |
| 2001/0039580 A1 | 11/2001 | Walker et al. |
| 2002/0059408 A1 | 5/2002 | Pattabhiraman et al. |
| 2003/0152114 A1 * | 8/2003 | Sandstrom .................. 370/537 |
| 2005/0190758 A1 | 9/2005 | Gai et al. |

FOREIGN PATENT DOCUMENTS

| | | |
|---|---|---|
| EP | 0468818 A2 | 1/1992 |
| JP | 2005080037 A | 3/2005 |
| WO | 00 60815 | 10/2000 |
| WO | 02 054640 | 7/2002 |

OTHER PUBLICATIONS

Takase, et al., "Broadband Subscriber Loop Systems" Hitachi Review, Hitachi Ltd. Tokyo, JP, vol. 40, No. 3, Jun. 1, 1991, pp. 199-204.

"Digital Hierarchy—Optical Interface Rates and Formats Specification" American National Standard, vol. TI. 105-1988, 1988, the whole document.

* cited by examiner

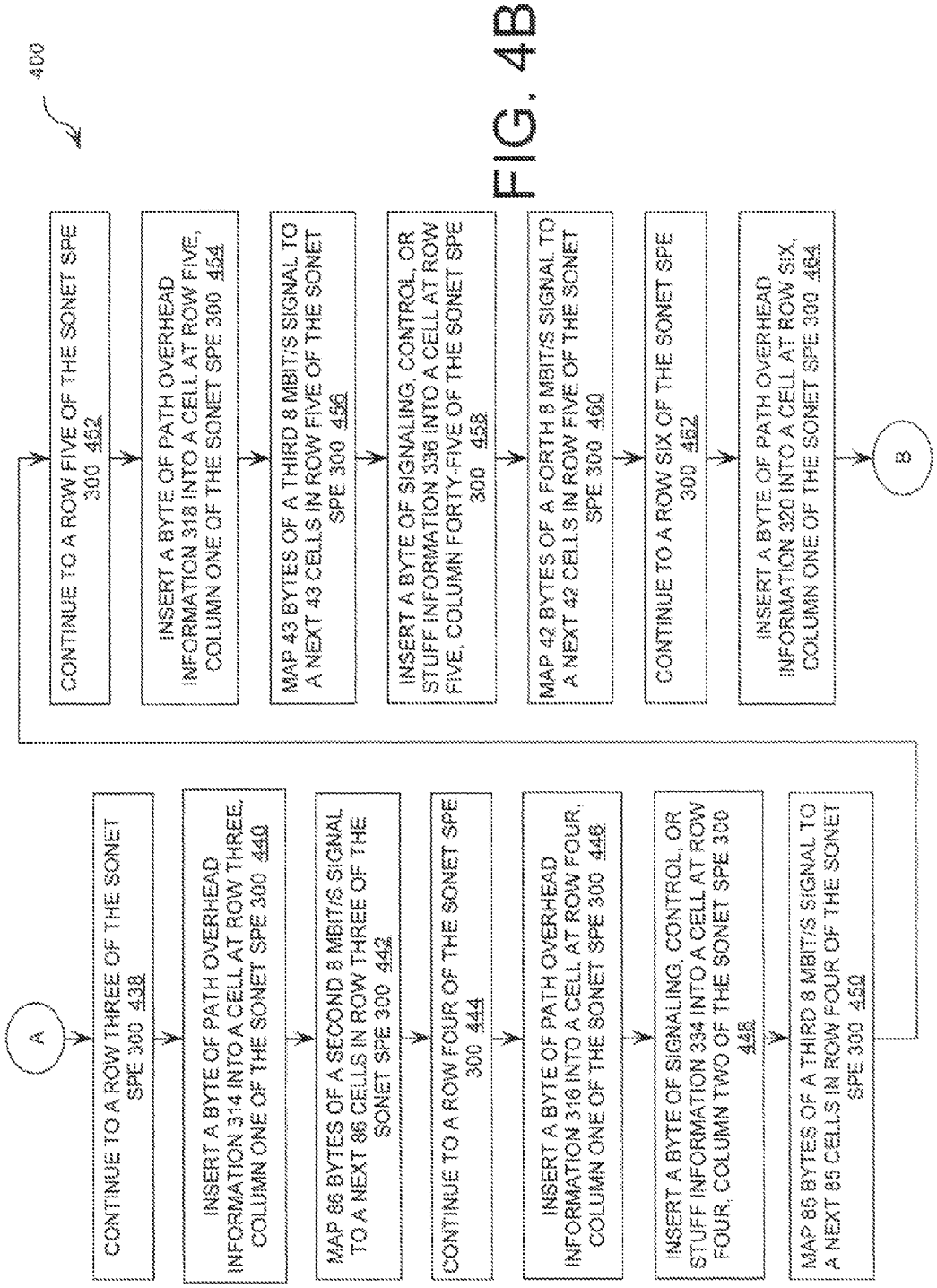

MAPPING SIX (6) EIGHT (8) MBIT/S SIGNALS TO A SONET FRAME

BACKGROUND OF THE INVENTION

1. Statement of the Technical Field

The invention concerns the transportation of digital information on optical media. More particularly, the invention concerns the transportation of a plurality of eight (8) megabit per second signals in accordance with a Synchronous Optical Network (SONET) standard.

2. Description of the Related Art

A Synchronous Optical Network (SONET) provides a system for transmitting digital payload information (for example, voice, video or data traffic) over an optical fiber and/or a copper wire. The basic unit of transmission for SONET is Synchronous Transport Signal one (STS-1). The STS-1 bit transfer rate equals 51.840 megabits per second. In this regard, STS-1 provides a framing format used for the transmission of control and digital information within a SONET based network. A STS-1 frame consists of ninety (90) columns by nine (9) rows of bytes. The STS-1 frame consists of a transport overhead (TOH) and a synchronous payload envelope (SPE). The TOH occupies three (3) columns by nine (9) rows of bytes. The TOH includes section and line control information. The transport overhead bandwidth is approximately 2 megabits per second. The SPE occupies eighty-seven (87) columns by nine (9) rows of bytes. The SPE includes path overhead (POH) and digital payload information (for example, voice, video or data traffic). The SPE bandwidth is approximately fifty (50) megabits per second.

Virtual tributaries (VTs) are subsets of STS-1. VTs transport digital information at a lower bit rate than an STS-1 format. There are four (4) standard defined VT sizes suitable for a Time Division Multiplexing (TDM) Network hierarchy. These include a VT1.5 (i.e., bit transfer rate equals 1.728 megabits per second), a VT2 (i.e., bit transfer rate equals 2.304 megabits per second), a VT3 (i.e., bit transfer rate equals 3.456 megabits per second), and a VT6 (i.e., bit transfer rate equals 6.912 megabits per second). It should be understood that two or more VTs can be grouped together using a virtual concatenation technique to from a single STS entity having a higher bit rate than its constituent VTs.

Various private and governmental clients have specific bit rates at which they prefer to transmit digital payload information (for example, voice, video or data traffic) through a network, such as a TDM Network. For example, a client prefers eight (8) megabits of digital information to be transmitted through a TDM Network every second. In such a scenario, the eight (8) megabits per second signal needs to be mapped to a SONET frame. One technique that can be used for this purpose requires mapping the eight (8) megabits per second signal into a fifty (50) megabits per second SPE. However, this technique suffers from certain drawbacks. Specifically, this technique is inefficient because less than one sixth (⅙) of the SPE bandwidth is used.

Another technique that can be used for this purpose requires the mapping of the eight (8) megabits per second signal to a single VT. However, there are no appropriately sized VTs that can accommodate an eight (8) megabits per second transfer rate directly.

Yet another technique that can be used for this purpose requires employing virtual concatenation. In this regard, virtual concatenation of four (4) VT2s can form an eight (8) megabits per second signals. However, this technique also suffers from drawbacks. Specifically, this technique requires special hardware, such as an inverse multiplexer, to break the eight (8) megabits per second into four (4) VT2s and to reassemble the eight (8) megabits per second signal.

In view of the forgoing, there remains a need for a method of mapping an eight (8) megabits per second signal into a SONET frame without wasting bandwidth.

SUMMARY OF THE INVENTION

The invention concerns a system for filling a SONET SPE with bytes of digital information. The system is comprised of one or more data input ports configured to receive eight (8) Mbit/s signals. The eight (8) Mbit/s signals include payload information. The system is also comprised of one or more data processing circuits configured to transfer bytes of payload information in sequence from each of the eight (8) Mbit/s signals. The data processing circuits are also configured to break the payload information into one or more byte segments. Each of the byte segments is comprised of one hundred twenty-eight (128) bytes of payload information. The data processing circuits are further configured to map the bytes segments to the SONET SPE in a byte by byte manner. The SONET SPE is comprised of a plurality of cells in rows one through nine (1-9), columns one through eighty-seven (1-87). The cells are filled from top to bottom in a manner proceeding row by row, from left to right in each row. The data processing circuits are configured to insert bytes of path overhead data into cells in rows one through nine (1-9), column one (1) of the SONET SPE or at the SONET SPE starting location defined by one or more SONET transport overhead (TOH) pointer bytes.

According to an embodiment of the invention, the data processing circuits are configured to insert a byte of data into the SONET SPE immediately before each respective one of the byte segments. The byte of data is selected from the group consisting of signaling information and control information. According to another embodiment of the invention, the data processing circuits are configured to insert a byte of data into the SONET SPE immediately after each respective one of the byte segments. The byte of data is also selected from the group consisting of signaling information and control information.

According to another embodiment of the invention, the data processing circuits are configured to insert bytes of signaling information or control information after a first byte of path overhead data. For example, the data processing circuits can be configured to insert bytes of signaling information of control information into cells in row one (1), columns two through seven (2-7) of the SONET SPE. According to yet another embodiment of the invention, the data processing circuits can be configured to insert bytes of signaling information or control information into a last six (6) cells of the SONET SPE. For example, the data processing circuits can be configured to insert bytes of signaling information or control information in row nine (9), columns eighty-two through eighty-seven (82-87) of the SONET SPE.

According to an aspect of the invention, the data processing circuits are configured to determine whether each of the data input ports is active or inactive. The data processing circuits are also configured to insert at least one stuff byte into the SONET SPE if a data input port is inactive.

According to another aspect of the invention, the system is also comprised of one or more signaling input ports configured to receive a plurality of sixty-four (64) Kbit/s signals. As such, the data processing circuits are configured to determine whether each of the signaling input ports is active or inactive. The data processing circuits are also configured to transfer bytes of signaling information in sequence from a sixty-four

(64) Kbit/s signal to obtain a signaling byte segment into the SONET SPE if a corresponding signaling input port is active. The data processing circuits are configured to insert a byte of stuff information into the SONET SPE if a corresponding signaling input port is inactive.

A method is also provided for filling a SONET SPE with a plurality of bytes of digital information corresponding to a plurality of eight (8) Mbit/s signals. The eight (8) Mbit/s signals include payload information. The method includes transferring bytes of payload information in sequence from each of the eight (8) Mbit/s signals. The method also includes breaking the payload information into one or more byte segments. Each of the byte segments are comprised of one hundred twenty-eight (128) bytes of payload information. The method further includes mapping the byte segments to the SONET SPE in a byte by byte manner. The SONET SPE is comprised of a plurality of cells in rows one through nine (1-9), columns one through eight-seven (1-87). The cells in filled from top to bottom in a manner proceeding row by row, from left to right in each row. The method includes inserting bytes of path overhead data into cells in rows one through nine (1-9), column one (1) of the SONET SPE or at the SONET SPE starting location defined by one or more SONET transport overhead (TOH) pointer bytes.

According to an embodiment of the invention, the method includes inserting a byte of data into the SONET SPE immediately before each respective one of the byte segments. The bytes of data is selected from the group consisting of signaling information and control information. According to another embodiment of the invention the method includes inserting a byte of data into the SONET SPE immediately after each respective one of the byte segments. This byte of data is also selected from the group consisting of signaling information and control information.

According to another embodiment of the invention, the method includes inserting bytes of signaling information or control information after a first byte of path overhead date. For example, the method can include inserting bytes of signaling information or control information into cells in row one (1), column two through seven (2-7)of the SONET SPE. According to yet another embodiment of the invention, the method includes inserting bytes of signaling information or control information into a last six (6) cells of the SONET SPE. For example, the method can include inserting bytes of signaling information or control information in row nine (9), columns eighty-two through eighty-seven (82-87) of the SONET SPE.

According to an aspect of the invention, the method includes determining whether each data input port of a plurality of data input ports is active or inactive. The method also includes inserting one or more stuff bytes into the SONET SPE if a data input port is inactive.

According to anther aspect of the invention, the method includes determining whether a signaling input port of a plurality of signaling input ports is active or inactive. The method also includes receiving a sixty-four (64) Kbit/s signal on at least one of the signaling input ports. The method further includes transferring bytes of signaling information in sequence from each received sixty-four (64) Kbit/s signal to obtain a signaling byte segment.

According to yet another aspect of the invention, each of the signaling input ports corresponds to one of the data input ports. As such, a sixty-four (64) Kbit/s signal received at an active signaling input port corresponds with an eight (8) Mbit/s signal received at a specific active input port. In this regard, the method includes inserting a signaling byte segment into the SONET SPE if a signaling input port corresponding to a specific data input port is active. The method also includes inserting a byte of stuff information into the SONET SPE if a signaling input port corresponding to a specific data input port is inactive.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

The present invention can be realized in one computer system. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly of after either or both of the following: a) conversion to another language, code, or notation; or b) reproduction in a different material form.

Embodiments of the present invention will now be described with respect to FIG. 1 through FIG. 7. Some embodiments of the present invention provide methods, systems, and apparatus relating to filling a SONET STS frame with bytes of path overhead data, bytes of digital payload information for a plurality of eight (8) Mbit/s signals, and bytes of signaling, control, and/or stuff information. Accordingly, embodiments including the listed functions are discussed further below.

As used herein, the term stuff information refers to one or more bytes that contain neither payload data nor signaling information. Stuff information is comprised of data bytes used as an aid to assembling data frames as described herein. This stuffing information or stuffing bits are used as dummy data and will generally be lacking in actual information content.

Figure 1:
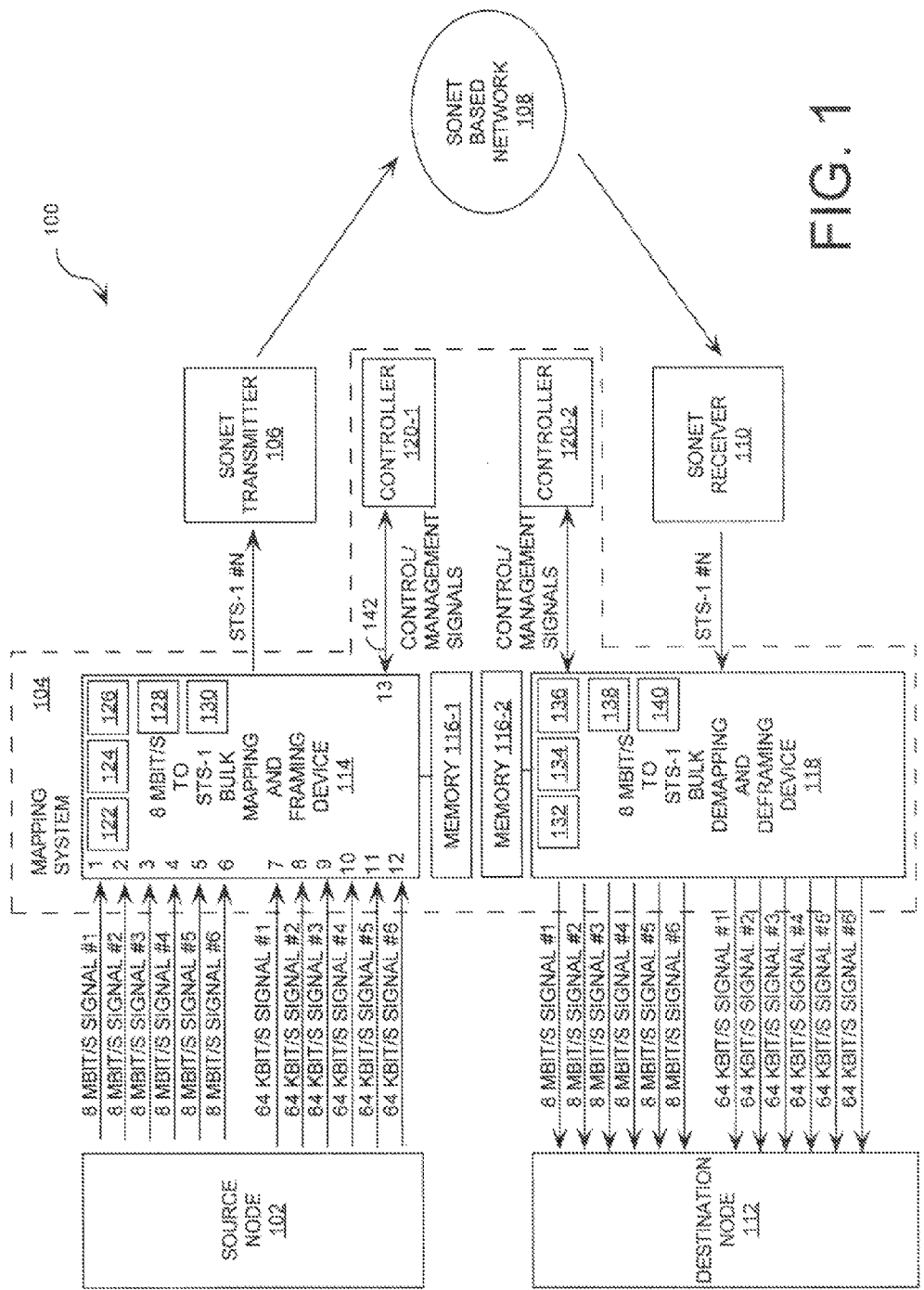
FIG. 1 is a block diagram of a communications network with a SONET mapping system that is useful for understanding the invention.

Referring now to FIG. 1, there provided a block diagram of a communications network 100 that is useful for understanding the invention. Communications network 100 is comprised of a source node 102, a mapping system 104, and a SONET transmitter 106. The communications network 100 is also comprised of a SONET receiver 110 and a destination node 112. The communications network 100 is further comprised of a SONET based network 108.

The source node 102 includes hardware and software for generating one or more signals including digital information such as voice, video, and/or data traffic. Such digital information can be thought of as the payload information of data of the source node as it generally comprises the information that is of primary interest to the user. The source node 102 optionally also generates a second type of information which will be referred to herein as signaling or control information. The source node 102 also includes hardware and software for transmitting the generated signals to the mapping system 104. As shown in FIG. 1, the source node 102 can transmit signals at various data transfer rates. For example, the source node 102 can operate at an eight (8) megabits per second (Mbit/s) transfer rate for digital payload information (such as voice, video, and/or data traffic). The source node 102 can also operate at a sixty-four (64) kilobits per second (Kbit/s) transfer rate for signaling information. Still, the invention is not limited in this regard. The source node 102 can operate at a transfer rate that is less than or equal to sixty-four (64) kilobits per second (Kbit/s) for signaling and control information.

Referring again to FIG. 1, the mapping system 104 is comprised of an 8 Mb to STS-1 mapping and framing device (8 Mb-STS MFD) 114, an 8 Mb to STS-1 demapping and deframing device (8 Mb-STS DDD) 118, controllers 120-1, 120-2, and memories 116-1, 116-2. The 8 Mb-STS MFD 114 includes hardware and software for receiving one or more signals having a defined bit transfer rate (for example, an eight (8) Mbit/s transfer rate and a sixty-four (64) Kbit/s transfer rate). According to an embodiment of the invention, the 8 Mb-STS MFD 114 can be comprised of six (6) eight (8) Mbit/s data input ports 1, 2, 3, 4, 5, 6 to provide a transmission path for digital payload information, such as voice and data. The 8 Mb-STS MFD 114 can also be comprised of six (6) sixty-four (64) Kbit/s signaling channel ports 7, 8, 9, 10, 11, 12 to provide a transmission path for signaling information (such as setup and packet data). the 8 Mb-STS MFD 114 can further be comprised of a control input port 13 to provide a transmission path for control information and/or management information. Still, it should be appreciated that the invention is not limited in this regard. The 8 Mb-STS MFD 114 can be comprised of various numbers of data input ports, signaling channel ports, and control/management input ports in accordance with a communications network 100 application.

According to an aspect of the invention, the 8 Mb-STS MFD 114 can relate a signal including payload information arriving on a particular data input port 1, 2, 3, 4, 5, 6 to a signal including signaling information arriving on a particular signaling channel port 7, 8, 9, 10, 11, 12. As such, each signaling channel port 7, 8, 9, 10, 11, 12 can correspond to a particular data input port 1, 2, 3, 4, 5, 6.

According to a preferred embodiment of the invention, a fixed correspondence method is employed for relating a signal including payload information arriving on a particular data input port 1, 2, 3, 4, 5, 6 to a signal including signaling information arriving on a particular signaling channel port 7, 8, 9, 10, 11, 12. In such a scenario, signaling channel port 7 corresponds to data input port 1. Similarly, signaling channel port 8 corresponds to data input port 2. Likewise, signaling channel port 9 corresponds to data input port 3. Signaling channel ports 10, 11, 12 correspond to data input ports 4, 5, 6, respectively.

According to another embodiment of the invention, a flexible, configurable mapping method is employed for relating a signal including payload information arriving on a particular data input port 1, 2, 3, 4, 5, 6 to a signal including signaling information arriving on a particular signaling channel port 7, 8, 9, 10, 11, 12. In such a scenario, signaling channel port 7 can be selected to correspond to any data input port 1, 2, 3, 4, 5, 6. Similarly, signaling channel port 8 can be selected to correspond to any data input port 1, 2, 3, 4, 5, 6 that has not already been assigned to signaling channel port 7. Likewise, signaling channel port 9 can be selected to correspond to any data input port 1, 2, 3, 4, 5, 6 that has not already been assigned to signaling channel ports 7 and 8. Signaling channel ports 10, 11, and 12 can be selected to correspond to any data input port 1, 2, 3, 4, 5, 6 in the same manner. As will be understood by a person skilled in the art, a one (1) input, six (6) output selector device is required for each of the six (6) signaling channel ports for implementing such a flexible, configurable mapping method it should be understood that the one (1) input, six (6) output selector device is capable of no selection when a signaling channel port is not present.

The 8 Mb-STS MFD 114 can also be comprised of one or more data processing circuits configured to transfer bytes of payload information in sequence from a received eight (8) Mbit/s signal and break the payload information into a plurality of byte segments (for example, each byte segment can include one hundred twenty-eight (128) bytes of payload information). Similarly, the one or more data processing circuits comprising 8 Mb-STS MFD 114 can be configured to transfer bytes of signaling information in sequence from a received sixty-four (64) Kbit/s signal and perform processing on the signaling information to obtain a signaling byte segment. For example, the signaling byte segment can be comprised of one (1) byte. Likewise, the 8 Mb-STS MFD 114 can transfer bytes of control information in sequence from a received control/management signal and perform processing on the control information to obtain a one (1) byte segment.

As shown in FIG. 1, the 8 Mb-STS MFD 114 is coupled to the memory 116-1 which may be a RAM, a disk drive, and/or any other form of program bulk-storage. As such, the 8 Mb-STS MFD 114 can store digital, signaling, and/or control information in the memory 116-1 according to a desired population scheme. For example, a plurality of bytes of payload information can be stored in a table format such that the plurality of bytes of payload information are associated with a particular data input port 1, 2, 3, 4, 5, 6. Similarly, a plurality of bytes of signaling information can be stored in a table format such that the plurality of bytes of signaling information can be associated with a particular signaling channel port 7, 8, 9, 10, 11, 12. The 8 Mb-STS MFD 114 can also retrieve the digital, signaling, and/or control information from the memory 116-1.

The 8 Mb-STS MFD 114 also includes up-counters 122, 124, 126, 128, 130 configured to perform counter-increment functions. The up-counters can be implemented in any suitable manner. For example, the up-counters can be implemented in software within one or more data processing circuits included in 8 Mb-STS MFD 114. Alternatively, the up-counters can be implemented as separate hardware entities. The up-counter 122 can be selected as a SONET synchronous payload envelop (SPE) row counter. The up-counter 124 can be selected as a SONET SPE column counter. The up-counter 126 can be selected as an eight (8) Mbit/s signal counter 130 can be selected as a payload information byte counter. The counters 122, 124, 126, 128, 130 are well know to persons skilled in the art. Thus, counters will not be described in great detail herein.

The 8 Mb-STS MFD 114 further includes hardware and software for executing a method to map a plurality of bytes of payload information (for example, one hundred twenty-eight bytes of payload information) into a SPE of a SONET STS-1 frame (described below in relation to FIG. 2). This method includes consecutively inserting the plurality of bytes of payload information into the SPE of a SONET STS-1 frame. A number of hardware/software routines implementing this method are described in detail below (in relation to FIG. 3 through FIG. 7). However, it should be appreciated that the invention is not limited in this regard. This method may be implemented in any form such as an entirely hardware embodiment, an entirely software embodiment, or a hardware/software embodiment.

In addition to the one or more data processing circuits included in 8 Mb-STS MFD 114, the 8 Mb-STS MFD 114 can include hardware and/or software for inserting bytes of signaling, control, and/or stuff information into the SPE of a SONET STS-1 frame (described below in relation to FIG. 2). A number of hardware/software routines implementing this inserting function are also described below (in relation to FIG. 3 through FIG. 7). However, it should be appreciated that the invention is not limited in this regard. This method of inserting bytes of signaling, control, and/or stuff information into the SPE may be implemented in any form such as an entirely hardware embodiment, an entirely software embodiment, or a hardware/software embodiment.

This 8 Mb-STS MFD 114 also includes hardware and software for inserting bytes of a section overhead data, a line overhead data, and a path overhead data into a SONET STS-1 frame (described below in relation to FIG. 2). A person skilled in the art will appreciate that a STS-1 is the basic unit of transmission for the SONET based network 108. In this regard, a STS-N (for example, STS-1, STS-3, STS-12, STS-48, and/or STS-192) formatted signal can be obtained by interleaving 'N' STS-1 formatted signals. The techniques used for interleaving a plurality of STS-1 formatted signals are well known to persons skilled in the art. Thus, such techniques will not be described in great detail herein. However, it should be appreciated that any such technique can be used without limitation.

A person skilled in the art will appreciate that functions necessary for inserting various types of overhead data as described above, can be performed by a device external to the 8 Mb-STS MFD 114 (such as, an external SONET framer). In this regard, the architecture of FIG. 1 can be amended accordingly. For example, the device 114 can be selected as an 8 Mb-STS mapping device, exclusive of SONET framing functions. The 8 Mb-STS mapping device can be absent of hardware and/or software configured to perform the overhead inserting functions. The 8 Mb-STS mapping device can be followed by a SONET framer. SONET framers are well know to persons skilled in the art. Thus, SONET framers will not be described in great detail herein.

The controller 120-1 is coupled to the 8 Mb-STS MFD 114 via a bus 142. The controller 120-1 is comprised of a circuit configured for communicating signals to the 8 Mb-STS MFD 114. The signals can include control information and/or management information. As will be understood by those skilled in the art, the controller 120-1 can be externally connected to a local or a remote network management system (not shown) so as to provide a control capability for an operator to configure the 8 Mb-STS MFD 114. In this regard, it should be appreciated that such a configuration can provide a control capability for an operator to configure the data input ports 1, 2, 3, 4, 5, 6 and the signaling channel ports 7, 8, 9, 10, 11, 12 of the 8 Mb-STS MFD 114.

The SONET transmitter 106 includes hardware and software for transmitting a SONET STS-1 signal over the SONET based network 108. The SONET based network 108 is well known to persons skilled in the art. Thus, the SONET based network will not be described in great detail herein.

The SONET receiver 110 includes hardware and software for receiving a SONET STS-1 formatted signal. The SONET receiver 110 also includes a circuit configured for transmitting the received signal to the 8 Mb-STS DDD 118.

The 8 Mb-STS DDD 118 includes hardware and software for de-framing a SONET STS-1 formatted signal. The term de-framing as used herein refers to the process of extracting bytes of section overhead data, line overhead data, and path overhead data from the SONET signal. It should be appreciated that there are many methods know in the art for de-framing a SONET STS-1 formatted signal. A person skilled in the art will appreciate that any such method can be used without limitation.

A person skilled in the art will appreciate that overhead extracting functions, described above, can be performed by a device external to the 8 Mb-STS DDD 118 (such as, an external SONET deframer). In this regard, the architecture of FIG. 1 can be amended accordingly. For example, the device 118 can be selected as an 8 Mb-STS demapping device exclusive of SONET de-framing functions. The 8 Mb-STS demapping device can be absent of hardware and/or software configured to perform the overhead extracting functions. The 8 Mb-STS demapping device can be followed by a SONET deframer. SONET deframers are well know to persons skilled in the part. Thus, SONET deframers will not be described in great detail herein.

A shown in FIG. 1, the 8 Mb-STS DDD 118 also includes up-counters 132, 134, 136, 138, 140 configured to perform counter-increment functions. The up-counters can be implemented in any suitable manner. For example, the up-counters can be implemented in software within one or more data processing circuits included in 8 Mb-STS DDD 118. Alternatively, the up-counters can be implemented as separate hardware entities. The up-counter 132 can be selected as a SONET SPE row counter. The up-counter 134 can be selected as a SONET SPE column counter. The up-counter 136 can be selected as an eight (8) Mbit/s signal counter. The up counter 138 can be selected as a signaling channel counter. The up counter 140 can be selected as a payload information byte counter. The counters 132, 134, 136, 138, 140 are well known to persons skilled in the art. Thus, counters will not be described in great detail herein.

The 8 Mb-STS DDD 118 is also coupled to the memory 116-2, which may be a RAM, a disk drive, and/or any other form of program bulk-storage. As such, the 8 Mb-STS DDD 118 can store digital, signaling, and/or control information in the memory 116-2 according to a desired population scheme (for example, a table format). The 8 Mb-STS DDD 118 can also retrieve the same from the memory 116-2.

The 8 Mb-STS DDD 118 includes hardware and software for performing the inverse functions of those executed by the 8 Mb-STS MFD 114. In this regard, the destination node 112 can operate at the same rate service as the source node 102 (for example, a rate service of eight (8) Mbit/s for payload information and a rate service of sixty-four (64) Kbit/s for signaling information). However, it should be appreciated that the invention is not limited in this regard. For example, the 8 Mb-STS DDD 118 can include hardware and software for performing SONET demapping function in accordance with a particular destination node 112 service (such as, a T1 rate service of 1.544 Mbit/s or a E1 rate service of 2.048 Mbit/s).

A person skilled in the art will appreciate that communications network 100 architecture is one embodiment of a communications network. However, the invention is not limited in this regard and any other communications network architecture can be used without limitation. For example, the up-counters 132, 134, 136, 138, 140 can alternatively be selected as down-counter circuits.

Figure 2:
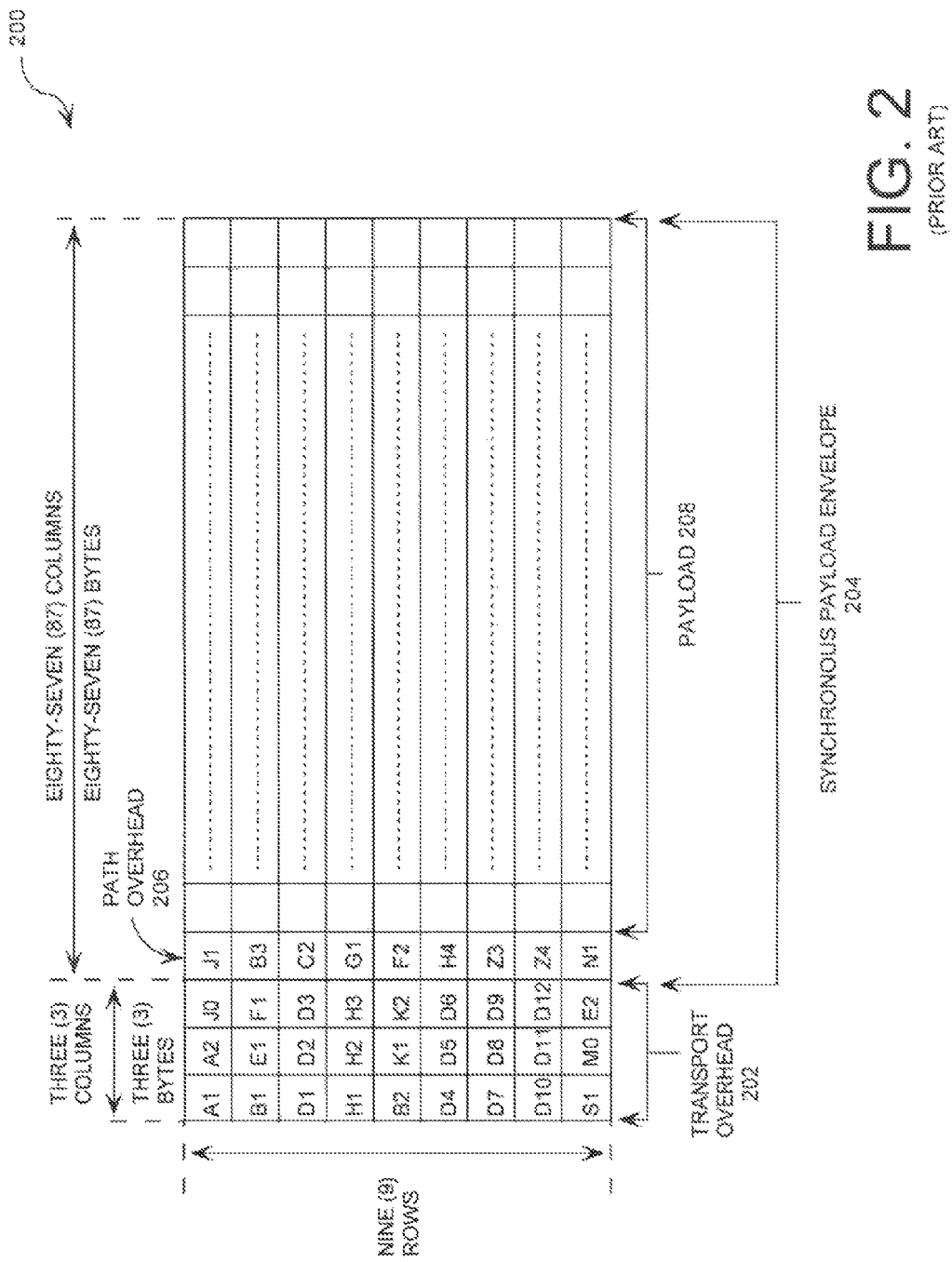
FIG. 2 is a format diagram of a SONET STS-1 frame that is useful for understanding the invention.

Referring now to FIG. 2, there is provided a format diagram of a SONET STS-1 frame 200 that is useful for understanding the invention. The STS-1 frame 200 is comprised of ninety (90) columns by nine (9) rows of bytes. Such a configuration provides eight hundred ten (90×9=810) bytes of information per frame.

The STS-1 frame 200 is further comprised of a transport overhead (TOH) 202 and a synchronous payload envelope (SPE) 204. The TOH 202 occupies three (3) columns by nine (9) rows of bytes. In this regard, the TOH 202 includes twenty-seven (3 columns×9 rows=27) bytes of information. Specifically, the TOH 202 includes data associated with section and line control information (for example, A1, A2, J0, B2, and K1). The section and line control information is well known to persons skilled in the art. Thus, section and line control information will not be described in great detail herein.

The SPE 204 occupies eighty-seven (87) columns by nine (9) rows of bytes. In this regard, the SPE 204 includes seven hundred eighty-three (87 columns×9 rows=783) bytes of information. The SPE 204 includes a path overhead (POH) 206 and a payload 208. As shown in FIG. 2, the POH 206 occupies the first column of the SPE 204, thus includes nine (1 column×9 rows=9) bytes of information. However, a person skilled in the art will understand that a pointer-adjusted SPE may have a POH starting byte at a location other than row one (1), column one (1). This location is typically defined by one or more SONET TOH pointer bytes. As such, it should be appreciated that the STS-1 frame 200 architecture shown in FIG. 2 is provided merely for simplicity. The POH is will known to persons skilled in the art. Thus, the POH will not be described in great detail herein.

As shown in FIG. 2, the payload 208 occupies eighty-six (86) columns by nine (9) rows of bytes. In this regard, the payload 208 has a capacity of seven hundred seventy-four (86 columns×9 rows=774) bytes of information (for example, payload information, signaling information, control information, and/or stuff information).

The foregoing description is useful for understanding a STS-1 frame 200. In this regard, a more detailed description of the STS-1 frame 200 can be found in "Synchronous Optical Network (SONET)—Basic Description including Multiplex Structures, Rates, and Formats," provided by the American National Standards Institute. The entire disclosure of this publication is incorporated herein by reference.

Methods for Mapping a Plurality of Eight (8) Mbit/s Signals to a SONET SPE

Embodiments of the present invention will now be described with respect to FIG. 3 through FIG. 7. Some embodiments of the present invention provide methods, systems, and apparatus relating to filling a SONET STS frame with bytes of path overhead data, bytes of payload information for a plurality of eight (8) Mbit/s signals, and bytes of signaling, control, and/or stuff information. Accordingly, embodiments including the listed functions are discussed in detail below.

Figure 3:
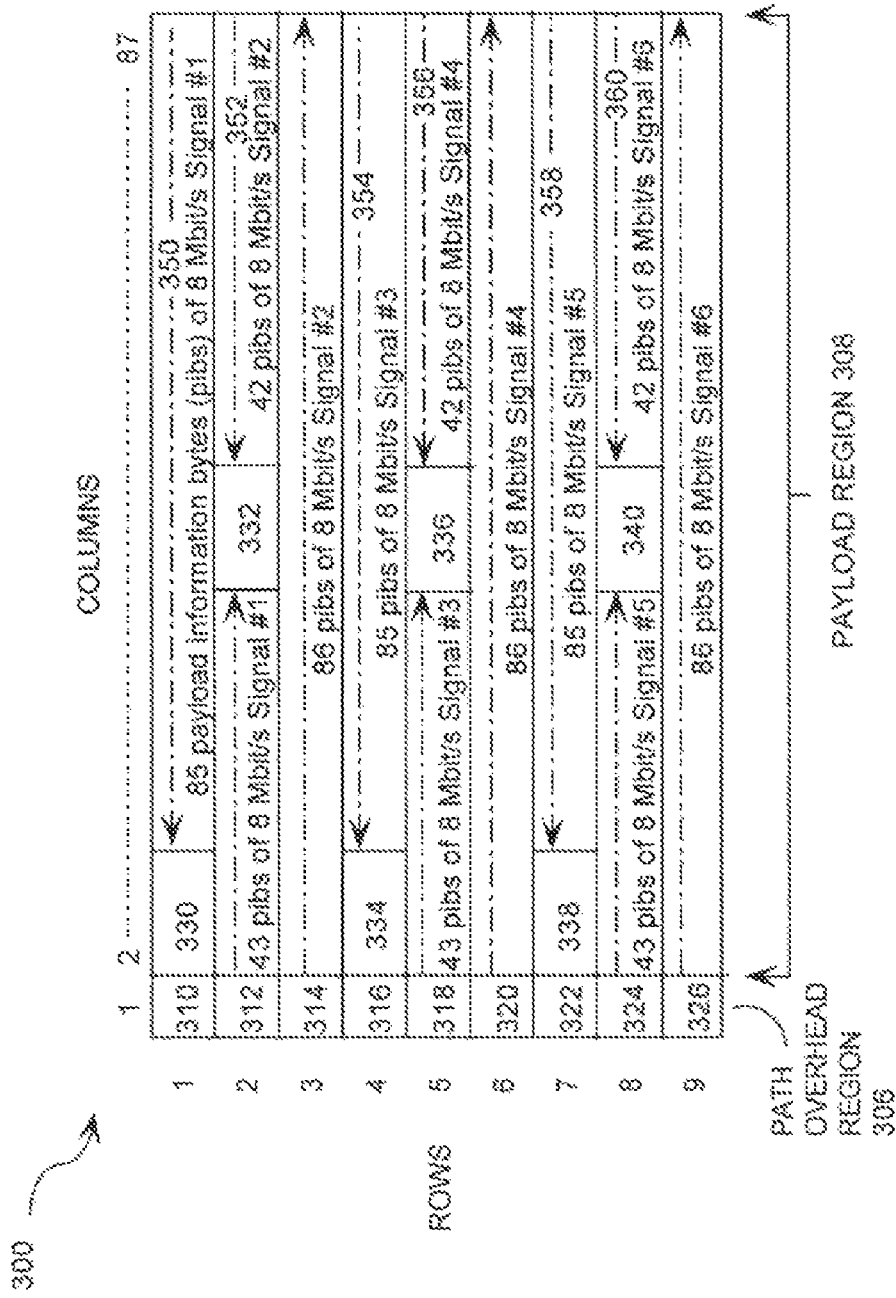
FIG. 3 is a format diagram of a SONET synchronous payload envelope that is useful for understanding the invention.

Referring now to FIG. 3, there is provided a format diagram of a SONET SPE 300 that is useful for understanding the invention. As shown in FIG. 3, the SONET SPE 300 is comprised of a path overhead region 306 and a payload region 308. The path overhead region 306 occupies the first column of the SONET SPE 300, thus includes nine bytes 310, 312, 314, 316, 318, 320, 322, 324, 326 of path overhead data. The payload region 308 occupies eight-six (86) columns by nine (9) rows of bytes. As shown in FIG. 3, the payload region 308 is also comprised of six (6) bytes of signaling, control, and/or stuff information 330, 332, 334, 336, 338, 340. The payload region 308 also includes seven hundred sixty-eight (86 columns×9 rows–6 bytes=768) bytes of payload information 350, 352, 354, 356, 358, 360 associated with six (6) eight (8) Mbit/s signals. In this regard, the payload region 308 includes one hundred twenty-eight (768 bytes/6 signals=128)bytes of payload information 350, 352, 354, 356, 358, 360 per eight (8) Mbit/s signal.

It should be appreciated that a byte of signaling, control, and/or stuff information 330, 332, 334, 336, 338, 340 reside prior to the bytes of payload information 350, 352, 354, 356, 358, 360 associated with each eight (8) Mbit/s signal. For example, byte 330 resides prior to the bytes of payload information 350 associated with a first eight (8) Mbit/s signal. Similarly, byte 332 resides prior to the bytes of payload information 352 associated with a second eight (8) Mbit/s signal. Likewise, byte 334 resides prior to the bytes of payload information 354 associated with a third eight (8) Mbit/s signals. Byte 336 resides prior to the bytes of payload information 356 associated with a forth eight (8) Mbit/s signal. Byte 338 resides prior to the bytes of payload information 358 associated with a fifth eight (8) Mbit/s signal. Byte 340 resides prior to the bytes of payload information 360 associated with a sixth eight (8) Mbit/s signal.

It should be further appreciated that the format of a SONET SPE 300 provides for a method to transport a plurality of eight (8) Mbit/s signals efficiently over the SONET based network 108. The transport efficiency can be described by mathematical Equation (1).

$$\text{Transport Efficiency (\%)} = (\text{Total SPE bytes used}/\text{Payload Capacity}) \times 100 \qquad (1)$$

First, consider the scenario where the six (6) bytes of signaling, control, and/or stuff information 330, 332, 334, 336, 340 are unused. In this case, the 'Total SPE bytes used' equals seven hundred sixty-eight (768). The 'payload capacity' equals seven hundred seventy-four (774). Therefore, the 'transport efficiency' equals approximately ninety-nine point two percent (99.2%). Alternatively, consider the scenario where the six (6) bytes of signaling, control, and/or stuff information 330, 332, 334, 336, 338, 340 are used. As such, the 'Total SPE bytes used' equals seven hundred seventy-four (774). The 'payload capacity' equals seven hundred seventy-four (774). Thus, the 'transport efficiency' equals one hundred percent (100%).

A person skilled in the art will appreciate that the format of a SONET SPE 300 is one embodiment of a SONET SPE format. However, the invention is not limited in this regard and any other SONET SPE format can be used without limitation.

Figure 4A:
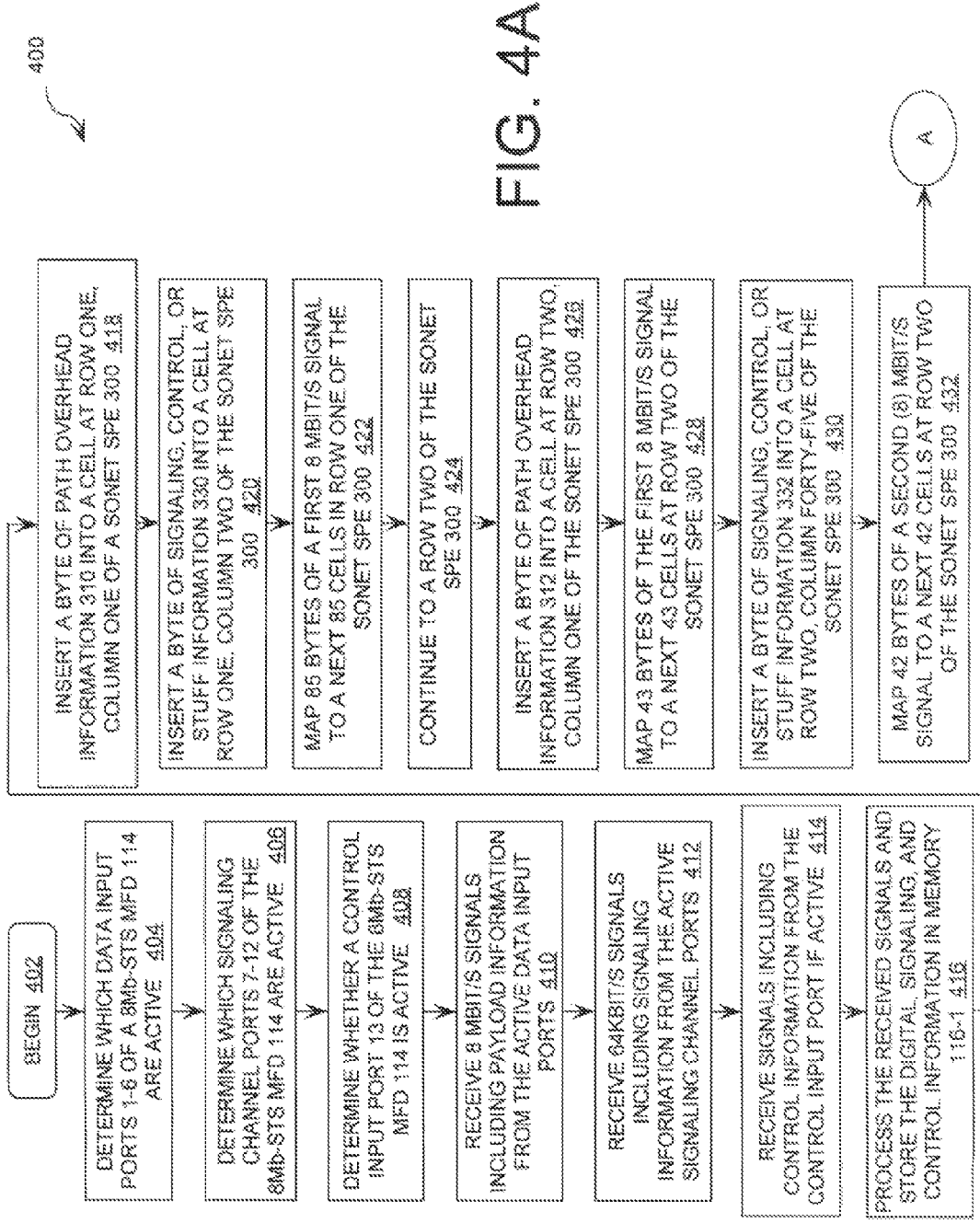
FIG. 4 is a flow diagram of a method for filling a SONET synchronous payload envelope in accordance with the format shown in FIG. 3.
Figure 4C:
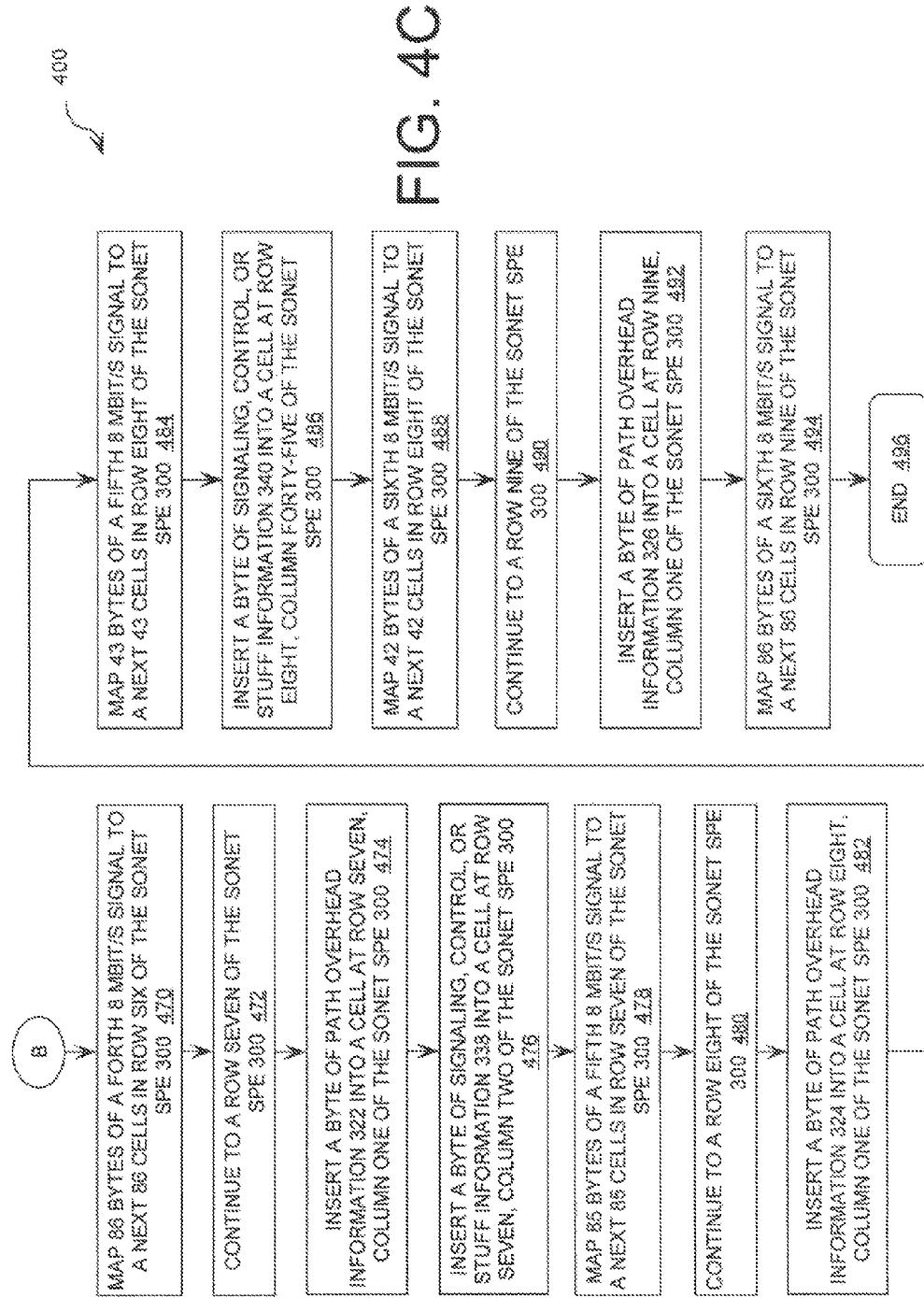

Referring now to FIGS. 4A-4C, there is provided a flow diagram of a method for filling a SONET SPE 300 in accordance with the format shown in FIG. 3. It should be appreciated that the SONET SPE 300 is filled in a manner that is in accordance with standards provided by the American National Standards Institute. For example, seven hundred eighty-three (783) cells in rows 1-9, columns 1-87 of the SONET SPE 300 are filled from top to bottom in a manner that proceeds row by row, from left to right in each row. see ANTSI T1.105, section 7.1 page 12.

Referring now to FIG. 4A, there is provided a method 400 for filling a SONET SPE 300. The method 400 begins at step 402 and continues to step 404. In step 404, a determination is made as to which data input ports 1, 2, 3, 4, 5, 6 of an 8 Mb-STS MFD 114 are active. Subsequently, control passes to step 406 where a determination is made as to which signaling channel port 7, 8, 9, 10, 11, 12 of the 8 Mb-STS MFD 114 are active. In step 408, a determination is made as to whether of not a control input port 13 of the 8 Mb-STS MFD 114 is active. After completing step 408, the method 400 continues with step 410. In step 410, the 8 Mb-STS MFD 114 receives eight (8) Mbit/s signals from a source 102. It should be appreciated that the 8 Mb-STS MFD 114 will only receive eight (8) Mbit/s signals through the active data input ports 1, 2, 3, 4, 5, 6. Similarly in step 412, the 8 Mb-STS MFD 114 receives sixty-four (64) Kbit/s signals from the source 102. It should be appreciated that the 8 Mb-STS MFD 114 will only receive sixty-four (64) Bit/s signals through the active signaling channel ports 7, 8, 9, 10, 11, 12. In step 414, the 8 Mb-STS MFD 114 receives control signals from a controller 120-1 if the control input port 13 is active. After receiving eight (8) Mbit/s signals, sixty-four (64) Kbit/s signals, and/or control signals, the method 400 continues with step 416.

In step 416, the received signals are processed. This can involve transferring bytes of payload information in sequence from the received eight (8) Mbit/s signals. The payload information can be broken into a plurality of byte segments (for example, one hundred twenty-eight (128) byte segments per eight (8) Mbit/s signal). This step can also involve transferring bytes of signaling information in sequence from a received sixty-four (64) Kbit/s signal. Processing can be performed on the signaling information to obtain a one (1) byte segment. This step can further involve parsing control information from a received control/management signal. Processing can be performed on the control information to obtain a one (1) byte segment. The bytes of digital, signaling, and/or control information are stored in a memory 116-1.

After step 416, control passes to step 418 where a byte of path overhead data 310 is inserted into a cell at row one, column one of a SONET SPE 300. This step can involve performing functions to set each of a SONET SPE row counter 122 and a SONET SPE column counter 124 to a value of one (1). Subsequently, step 420 is performed where a byte of signaling, control, or stuff information 330 is inserted into a cell in row one, column two of the SONET SPE 300. It should be appreciated that stuff information is inserted into the cell in row one, column two of the SONET SPE 300 when signaling channel port 7 is inactive. It should also be appreciated that this step can involve performing functions to increment a SONET SPE column counter 124 by one (+1) and to set a signaling channel counter 128 to one (1). This step can also involve querying the memory 116-1 for the byte of signaling, control, and/or stuff information 330 and receiving the same from the memory 116-1.

After inserting a byte of signaling, control, and/or stuff information into the payload region 308, step 422 is performed. In step 422, eighty-five (85) bytes of payload information associated with a first eight (8) Mbit/s signal are mapped to the SONET SPE 300 in a byte by byte manner. It should be appreciated that the eighty-five (85) cells are filled in a row by row, from left to right manner. Therefore, step 422 involves consecutively inserting eighty-five (85) bytes of payload information to the last eighty-five (85) cells in row one of the SONET SPE 300. It should be appreciated that this step can involve inserting bytes of stuff information to the cells in row one of the SONET SPE 300 when the data input port 1 is inactive. It should also be appreciated that this step can involve performing functions to increment a SONET SPE column counter 124 each time a byte is inserted into a cell. This step can further involve performing functions to set an eight (8) Mbit/s signal counter 126 to a value of one (1), to set a payload information byte counter 130 to a value of one (1), and to increment the payload information byte counter 130 by one (+1) each time a byte of payload information is inserted into a cell. It should further be appreciated that this step can involve querying the memory 116-1 for the eighty-five (85) bytes of payload information and receiving the same from the memory 116-1.

Upon completing step 422, control passes to step 424 where method 400 continues to a row two of the SONET SPE 300. This step can involve performing a function to increment the SONET SPE row counter 122 by one (+1). In step 426, a byte of path overhead data 312 is inserted into a cell at row two, column one of a SONET SPE 300. This step can involve performing a function to re-set the SONET SPE column counter 124 to one (1).

Thereafter, step 428 is performed where forty-three (43) bytes of payload information associated with the first eight (8) Mbit/s signal are mapped to the SONET SPE 300 in a byte by byte manner. The forty-three (43) cells in row two of the SONET SPE 300 are filled in a row by row, from left to right manner. Therefore, step 422 involves consecutively inserting forty-three (43) bytes of payload information to forty-three (43) cells in row two of the SONET SPE 300. It should be appreciated that this step can involve inserting bytes of stuff information to the cells in row two of the SONET SPE 300 when the data input port 1 is inactive. It should also be appreciated that that this step can involve performing functions to increment a SONET SPE column counter 124 by one (+1) each time a byte is inserted into a cell. This step can involve performing functions to increment the payload information byte counter 130 by one (+1) each time a byte of payload information is inserted into a cell. It should further be appreciated that this step can involve querying the memory 116-1 for the forty-three (43) bytes of payload information and receiving the same from the memory 116-1.

After step 428, control passes to a step 430. In step 430, a byte of signaling, control, or stuff information 332 is inserted into the payload region 308. This step involves inserting the byte of signaling, control, or stuff information 332 into a cell in row two, column forty-five of the SONET SPE 300. It should be appreciated that a byte of stuff information is inserted into the cell in row two, column forty-five of the SONET SPE 300 when signaling channel port 2 is inactive. It should also be appreciated that this step can involve performing functions to increment the SONET SPE column counter 124 by one (+1). This step can involve performing functions to increment the signaling channel counter 128 by one (+1). It should further be appreciated that this step can involve querying the memory 116-1 for the byte of signaling, control, or stuff information 332 and receiving the same from the memory 116-1.

Subsequent to inserting the byte 332 into the payload region 308, step 432 is performed. In step 432, forty-two (42) bytes of payload information associated with a second eight (8) Mbit/s signal are mapped to the SONET SPE 300 in a byte to byte manner. It should be appreciated that cells of the payload region 308 are filled in a row by row, from left to right manner. Therefore, step 432 involves consecutively inserting forty-two (42) bytes of payload information into the remaining forty-two (42) cells in row two of the SONET SPE 300. It should be appreciated that this step can involve inserting bytes of stuff information to the forty-two (42) cells in row two of the SONET SPE 300 when data input port 2 is inactive. This step can also involve performing functions to increment the 8 Mbit/s signal counter 126 by one (+1), re-set the payload information byte counter 130 to a value one (1), and increment the payload information byte counter 130 by one (+1) search time a byte of payload information is inserted into a cell. This step further involves performing functions to increment the SONET SPE column counter 124 by one (+1) each time a byte is inserted into a cell. After mapping the forty-two (42) bytes to the SONET SPE 300, control passes to step 438 in FIG. 4B.

In step 438, the method 400 continues to a row three of the SONET SPE 300. This step can involve performing a function to increment the SONET SPE row counter 122 by one (+1). After step 438, control passes to step 440 where a byte of path overhead data 314 is inserted into a cell at row three, column one of a SONET SPE 300. This step can involve performing a function to re-set the SONET SPE column counter 124 to one (1).

In step 442, eight-six (86) bytes of payload information associated with a second eight (8) Mbit/s signal are mapped to the SONET SPE 300 in a byte to byte manner. It should be appreciated that cells of the payload region 308 are filled in a row by row, from left to right manner. Therefore, step 442 involves consecutively inserting the eighty-six (86) bytes of payload information into eight-six (86) cells in row three of the SONET SPE 300. It should be appreciated that this step can involve inserting bytes of stuff information to the eighty-six (86) cells in row three of the SONET SPE 300 when data input port 2 is inactive. This step can also involve performing a function to increment the SONET SPE column counter 124 and the payload information byte counter 130 by one (+1) each time a byte of payload information is inserted into a cell. This step can further involve querying a memory 116-1 for the eighty-six (86) bytes of payload information and receiving the same from the memory 116-1.

After the eighty-six (86) bytes of the second eight (8) Mbit/s signal are mapped to the SONET SPE 300, control passes to step 444. In step 444, the method 400 continues to a row four of the SONET SPE 300. This step can involve performing a function for incrementing the SONET SPE row counter 122 by one (+1). Subsequently, step 446 is performed where a byte of path overhead data 316 is inserted into a cell at row four, column one of a SONET SPE 300. This step can involve performing a function to re-set the SONET SPE column counter 124 to one (1).

In step 448, a byte of signaling, control, or stuff information 334 is inserted into the SONET SPE 300. This step involves inserting the byte of signaling, control, or stuff information 334 into a cell in row four, column two of the SONET SPE 300. It should be appreciated that a byte of stuff information is inserted into the cell in row four, column two the SONET SPE 300 when signaling channel port 3 is inactive. It should be also appreciated that this step can involve performing a function to increment the SONET SPE column counter 124 by one (+1). This step can also involve incrementing the signaling channel counter 128 by one (+1). It should further be appreciated that this step can involve querying the memory 116-1 for the byte of signaling, control, or stuff information 334 and receiving the same from the memory 116-1.

Subsequently, the method 400 continues with step 450 where eighty-five (85) bytes of payload information associated with a third eight (8) Mbit/s signal are mapped to the SONET SPE 300 in a byte to byte manner. It should be appreciated that the cells of the payload region 308 are filled in a row by row, from left to right manner. In this regard, step 450 involves consecutively inserting the eighty-five (85) bytes of payload information into the remaining cells in row four of the SONET SPE 300. It should be understood that this step can involve inserting bytes of stuff information to the eighty-five (85) cells in row four of the SONET SPE 300 when the data input port 3 is inactive. This step can also involve performing a function to increment the eight (8) Mbit/s signal counter 126 by one (+1). This step can further involve performing functions to increment the SONET SPE column counter 124 and the payload information byte counter 130 by one (+1) each time a byte of payload information is inserted into a cell. It should also be understood that this step can involve querying the memory 116-1 for the eighty-five (85) bytes of payload information and receiving the same from the memory 116-1.

Thereafter, control passes to step 452 where the method 400 continues to a row five of the SONET SPE 300. This step can involve performing a function to increment the SONET SPE row counter 122 by one (+1). In step 454, a byte of path overhead data 318 is inserted into a cell at row five, column one of a SONET SPE 300. This step can involve performing a function to re-set the SONET SPE column counter 124 to one (1).

After inserting byte 318 into the SONET SPE 300, step 456 is performed. In step 456, forty-three (43) bytes of payload information of the third eight (8) Mbit/s signal are mapped to the SONET SPE 300 in a byte to byte manner. It should be appreciated that the cells of the payload region 308 are filled in a row by row, from left to right manner. In this regard, step 450 involves consecutively inserting the forty-three (43) bytes of payload information into forty-three (43) cells in row five of the SONET SPE 300. It should be appreciated that this step can involve inserting bytes of stuff information to the cells in row five of the SONET SPE 300 when the data input port 3 is inactive. This step can also involve performing a function to increment the SONET SPE column counter 124 and the payload information byte counter 130 by one (+1) each time a byte of payload information is inserted into a cell. This step can further involve querying the memory 116-1 for the forty-three (43) bytes of payload information and receiving the same from the memory 116-1.

As shown in FIG. 4B, the method 400 continues with step 458 where a byte of signaling, control, or stuff information 336 is inserted into the SONET SPE 300. This step involves inserting the byte of signaling, control, or stuff information 336 into a cell in row five, column forty-five of the SONET SPE 300. It should be appreciated that a byte of stuff information is inserted into the cell in row five, column forty-five of the SONET SPE 300 when signaling channel port 10 is inactive. It should also be appreciated that this step can involve performing a function to increment the signaling channel counter 128 and the SONET SPE column counter 124 by one (+1). It should further be appreciated that this step can involve querying the memory 116-1 for the byte of signaling, control, or stuff information 336 and receiving the same from the memory 116-1.

In step 460, forty-two (42) bytes of payload information associated with a fourth eight (8) Mbit/s signal are mapped to the SONET SPE 300 in a byte by byte manner. It should be appreciated that the cells of the payload region 308 are filled in a row by row, form left to right manner. In this regard, step 434 involves consecutively inserting the forty-two (42) bytes of payload information into the remaining cells in row five of the SONET SPE 300. It should be understood that this step can involve inserting bytes of stuff information to the cells in row five of the SONET SPE 300 when data input port 4 is inactive. It should also be understood that this step can involve performing a function to increment the eight (8) Mbit/s signal counter 126 by one (+1). This step can also involve performing a function to increment the SONET SPE column counter 124 and the payload information byte counter 130 by one (+1) each time a byte of payload information is inserted into a cell. This step can further involve querying the memory 116-1 for the forty-two (42) bytes of payload information and receiving the same from the memory 116-1.

In step 462, the method 400 continues to a row six of the SONET SPE 300. This step can involve performing a function to increment the SONET SPE row counter 122 by one (+1). Thereafter, control passes to step 464 where a byte of path overhead data 320 is inserted into a cell at row six, column one of a SONET SPE 300. This step can involve performing a function to re-set the SONET SPE column counter 124 to one (1). After inserting byte 320 into the SONET SPE 300, step 466 is performed. Thereafter, control passes to step 470 in FIG. 4C.

In step 470, eight-six (86) bytes of payload information associated with a fourth eight (8) Mbit/s signal are mapped to the SONET SPE 300 in a byte by byte manner. It should be appreciated that the cells of the SONET SPE 300 are filled in a row by row, from left to right manner. In this regard, step 470 involves consecutively inserting the eight-six (86) bytes of payload information into the remaining cells in row six of the SONET SPE 300. It should be understood that this step can involve inserting bytes of stuff information to the cells in row six of the SONET SPE 300 when data input port 4 is inactive. It should also be appreciated that this step can involve performing a function to increment the SONET SPE column counter 124 and the payload information byte counter 130 by one (+1) each time a byte of payload information is inserted into a cell. This step can further involve querying the memory 116-1 for the eight-six (86) bytes of payload information and receiving the same from the memory 116-1.

After the eight-six (86) bytes of the fourth eight (8) Mbit/s signal are mapped to the SONET SPE 300, control passes to step 472. In step 472, the method 400 continues to a row seven of the SONET SPE 300. This step can involve performing a function to increment the SONET SPE row counter 122 by one (+1). In step 474, a byte of path overhead data 322 is inserted into a cell at row seven, column one of a SONET SPE 300. This step can involve performing a function to re-set the SONET SPE column counter 124 to one (1). After inserting byte 322 into the SONET SPE 300, step 476 is performed. In step 476, a byte a signaling, control, or stuff information 338 is inserted into the SONET SPE 300. This step involves inserting the byte of signaling, control, or stuff information 338 into a cell in row seven, column two of the SONET SPE 300. It should be also appreciated that this step can involve performing a function to increment the SONET SPE column counter 124 and the signaling channel counter 128 by one (+1). This step can further involve querying the memory 116-1 for the byte of signaling, control, or stuff information 338 and receiving the same from the memory 116-1.

Subsequently, the method 400 continues with step 478. In step 478, eighty-five (85) bytes of payload information associated with a fifth eight (8) Mbit/s signal are mapped to the SONET SPE 300 in a byte by byte manner. It should be appreciated that the cells of the payload region 308 are filled in a row by row, from left to right manner. In this regard, step 478 involves consecutively inserting the eighty-five (85) bytes of payload information into the remaining cells in row seven of the SONET SPE 300. It should be appreciated that this step can involve inserting bytes of stuff information to the eighty-five (85) cells in row seven of the SONET SPE 300 when data input port 5 is inactive. It should be also appreciated that this step can involve performing a function to increment the eight (8) Mbit/s signal counter 126 by one (+1). This step can involve performing a function to increment the SONET SPE column counter 124 and the payload information byte counter 130 by one (+1) each time a byte of payload information is inserted into a cell. This step can further involve querying the memory 116-1 for the eighty-five (85) bytes of payload information and receiving the same from the memory 116-1.

Thereafter, step 480 is performed where the method 400 continues to a row eight of the SONET SPE 300. This step can involve performing a function to increment the SONET SPE row counter 122 by one (+1). In step 482, a byte of path overhead data 324 is inserted into a cell at row eight, column one of a SONET SPE 300. This step can involve performing a function to re-set the SONET SPE column counter 124 to one (1).

As shown in FIG. 4C, the method 400 continues with step 484. In step 484, forty-three (43) bytes of payload information associated with the fifth eight (8) Mbit/s signal are mapped to the SONET SPE 300 in a byte by byte manner. It should be appreciated that the cells of the payload region 308 are filled in a row by row, from left to right manner. In this regard, step 484 involves consecutively inserting the forty-three (43) bytes of payload information into forty-three (43) cells in row eight of the SONET SPE 300. It should be appreciated that this step can involve inserting bytes of stuff information to the forty-tree (43) cells in row eight of the SONET SPE 300 when the data input port 5 is inactive. It should be further appreciated that this step can involve performing a function to increment the SONET SPE column counter 124 and the payload information byte counter 130 by one (+1) each time a byte of payload information is inserted into a cell. This step can further involve querying the memory 116-1 for the forty-three (43) bytes of payload information and receiving the same from the memory 116-1.

In step 486, a byte of signaling, control, or stuff information 340 is inserted into the SONET SPE 300. This step involves inserting the byte of signaling, control, or stuff information 340 into a cell in row eight, column forty-five of the SONET SPE 300. It should be appreciated that a byte of stuff information is inserted into the cell in row eight, column forty-five of the SONET SPE 300 when the signaling channel port 12 is inactive. It should be also appreciated that this step can involve performing a function to increment the SONET SPE column counter 124 and the signaling channel counter 128 by one (+1). This step can further involve querying the memory 116-1 for the byte of signaling, control, or stuff information 340 and receiving the same from the memory 116-1.

After step 486, control passes to step 488 where forty-two (42) bytes of payload information associated with a sixth eight (8) Mbit/s signal are mapped to the SONET SPE 300 in a byte by byte manner. It should be appreciated that cells of the SONET SPE 300 are filled in a row by row, from left to right manner. In this regard, step 488 involves consecutively inserting the forty-two (42) bytes of payload information into the remaining cells in row eight of the SONET SPE 300. It should be appreciated that this step can involve inserting bytes of stuff information to the forty-two (42) cells in row eight of the SONET SPE 300 when the data input port 6 is inactive. It should also be appreciated that this step can involve performing a function to increment the eight (8) Mbit/s signal counter 126 by one (+1) and to re-set the payload information byte counter 130 to one (1). This step can involve performing functions to increment the SONET SPE column counter 124 and the payload information byte counter 130 by one (+1) each time a byte of payload information is inserted into a cell. This step can further involve querying the memory 116-1 for the forty-two (42) bytes of payload information and receiving the same from the memory 116-1.

Subsequent to mapping the forty-two (42) bytes of a sixth eight (8) Mbit/s signal, control passes to step 490 where the method 400 continues to a row nine of the SONET SPE 300. This step can involve performing a function to increment the SONET SPE row counter 122 by one (+1). In step 492, a byte of path overhead data 326 is inserted into a cell at row nine, column one of a SONET SPE 300. This step can involve performing a function to re-set the SONET SPE column counter 124 to one (1).

The method 400 continues with step 494 where eighty-six (86) bytes of payload information associated with the sixth eight (8) Mbit/s signal are mapped to the SONET SPE 300 in a byte by byte manner. I should be appreciated that cells of the SONET SPE 300 are filled in a row by row, from left to right manner. In this regard, step 494 involves consecutively inserting the eighty-six (86) bytes of payload information into eighty-six (86) cells in row nine of the SONET SPE 300. It should be appreciated that this step can involve inserting bytes of stuff information to the eighty-six (86) cells in row nine of the SONET SPE 300 when the data input port 6 is inactive. It should also be appreciated that his step can involve performing a function to increment the SONET SPE column counter 124 and the payload information byte counter 130 by one (+1) each time a byte of payload information is inserted into a cell. I should further be appreciated that this step can involve querying the memory 116-1 for the eighty-six (86) bytes of payload information and receiving the same from the memory 116-1. Upon mapping the eighty-six (86) bytes to the SONET SPE 300 , step 496 is performed where the method 400 ends.

A person skilled in the art will appreciate that the method 400 is one embodiment of a method for mapping a plurality of eight (8) Mbit/s signals to the SONET SPE 300. However, the invention is not limited in this regard and any other method for mapping a plurality of eight (8) Mbit/s signals to a SONET SPE can be used without limitation. For example, the method 400 can be absent of steps 408, 414, and 416. Also, the up-counters 132, 134, 136, 138, 140 can alternatively be selected as down-circuit counters. In these regards, FIGS. 4A-4C can be amended accordingly.

Figure 5:
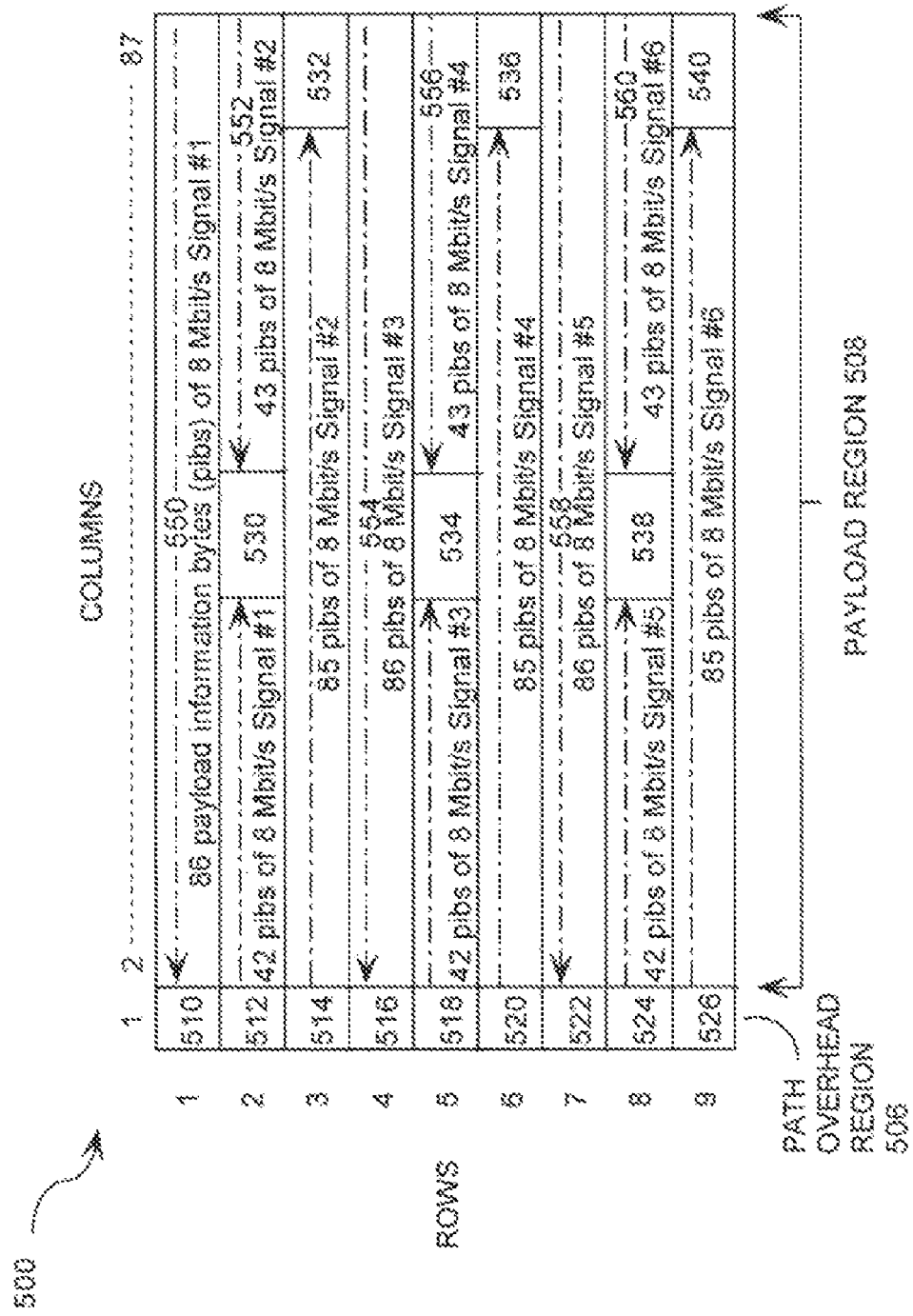
FIG. 5 is a format diagram of a SONET synchronous payload envelope that is useful for understanding the invention.

Referring now to FIG. 5, there is provided a format diagram of a SONET SPE 500 that is useful for understanding the invention. As shown in FIG. 5, the SONET SPE 500 is comprised of a path overhead region 506 and a payload region 508. The path overhead region 506 occupies the first column of the SONET SPE 500, thus includes nine bytes 510, 512, 514, 516, 518, 520, 522, 524, 526 of path overhead data. The payload region 508 occupies eight-six (86) columns by nine (9) rows of bytes. As shown in FIG. 5, the payload region 508 is also comprised of six (6) bytes of signaling, control, and/or stuff information 530, 532, 534, 536, 538, 540. The payload region 508 also includes seven hundred sixty-eight (86 columns×9 rows−6 bytes=768) bytes of payload information 550, 552, 554, 556, 558, 560 associated with six (6) eight (8) Mbit/s signal. In this regard, the payload region 508 includes one hundred twenty-eight (768 bytes/6 signals=128) bytes of payload information 550, 552, 554, 556, 558, 560 per eight (8) Mbit/s signal.

It should be appreciated that a byte of signaling, control, or stuff information 530, 532, 534, 536, 538, 540 reside after bytes of payload information 550, 552, 554, 556, 558, 560 associated with an eight (8) Mbit/s signal. For example, byte 530 resides after the bytes of payload information 550 associated with a first eight (8) Mbit/s signal. Similarly, byte 532 resides after the bytes of payload information 552 associated with a second eight (8) Mbit/s signal. Likewise, byte 534 reside after the bytes of payload information 554 associated with a third eight (8) Mbit/s signal. Byte 536 resides after the bytes of payload information 556 associated with a forth eight (8) Mbit/s signal. Byte 538 resides after the bytes of payload information 558 associated with a fifth eight (8) Mbit/s signal. Byte 540 resides after the bytes of payload information 560 associated with a sixth eight (8) Mbit/s signal.

It should also be appreciated that the format of a SONET SPE 500 provides for a method to transport a plurality of eight (8) Mbit/s signals efficiently over the SONET based network 108. For example, if the six (6) bytes of signaling, control, and/or stuff information 530, 532, 536, 538, 540 are unused, the 'Total SPE bytes used' equals seven hundred sixty-eight (768). The 'payload capacity' equals seven hundred seventy-four (774). As such, the 'transport efficiency' equals approximately ninety-nine point two percent (99.2%). see Equation (1). Alternatively, if the six (6) bytes of signaling, control, and/or stuff information 530, 532, 534, 536, 538, 540 are used, the 'Total SPE bytes used' equals seven hundred seventy-four (774). The 'payload capacity' equals seven hundred seventy-four (774). Therefore, the 'transport efficiency' equals one hundred percent (100%). see Equation (1).

A person skilled in the art will appreciate that a method similar to that shown in FIGS. 4A-4C can be used to fill the SONET SPE 500 with bytes of information. Specifically, the bytes of payload information 550, 552, 554, 556, 560 can be mapped to the SONET SPE 500 in a byte by byte manner. The cells of the SONET SPE 500 can be filled from top to bottom in a manner processing row by row, from left to right in each row. The counters 122, 124, 126, 128, 130 can be set, re-set, and incremented in a manner similar to that described above (in relation to FIGS. 4A-4C).

A person skilled in the art will also appreciate that the format of a SONET SPE 500 is one embodiment of a SONET SPE format. However, the invention is not limited in this regard and any other SONET SPE format can be used without limitation.

Figure 6:
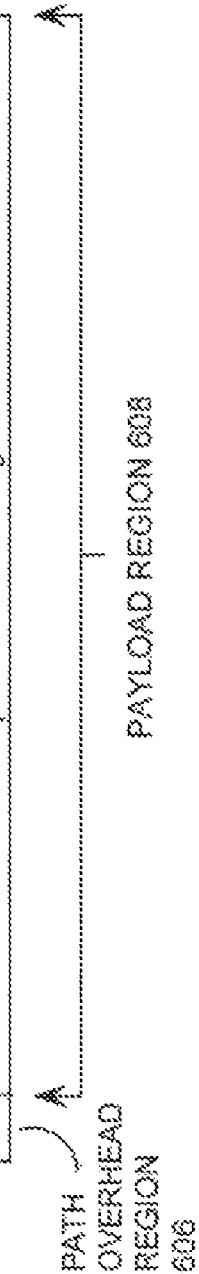
FIG. 6 is a format diagram of a SONET synchronous payload envelope that is useful for understanding the invention.

Referring now to FIG. 6, there is provided a format diagram of a SONET SPE 600 that is useful for understanding the invention. As shown in FIG. 6, the SONET SPE 600 is comprised of a path overhead region 606 and a payload region 608. The path overhead region 606 occupies the first column of the SONET SPE 600, thus includes nine bytes 610, 612, 614, 616, 618, 620, 622, 624, 626 of path overhead data. The payload region 608 occupies eighty-six (86) columns by nine (9) rows of bytes. As shown in FIG. 6, the payload region 608 is comprised of six (6) bytes of signaling, control, or stuff information 630, 632, 634, 636, 638, 640. The payload region 608 is also comprised of seven hundred-eight (86 columns×9 rows–6 bytes=768) bytes of payload information 650, 652, 654, 656, 658, 660 associated with six (6) eight (8) Mbit/s signal. In this regard, the payload region 608 includes one hundred twenty-eight (768 bytes/6 signals=128) bytes of payload information 650, 652, 654, 656, 658, 660 per eight (8) Mbit/s signal. It should be appreciated that the six (6) bytes of signaling, control, or stuff information 630, 632, 638, 640 reside prior to the bytes of payload information 650, 652, 654, 656, 660 associated with the six (6) eight (8) Mbit/s signals.

It should also be appreciated that the format of a SONET SPE 600 provides for a method to transport a plurality of eight (8) Mbit/s signals efficiently over the SONET based network 108. For example, if the six (6) bytes of signaling, control, and/or stuff information 630, 632, 634, 636, 638, 640 are unused, the 'Total SPE bytes used' equals seven hundred sixty-eight (768). The 'payload capacity' equals seven hundred seventy-four (774). As such, the 'transport efficiency' equals ninety-nine point two percent (99.2%). see Equation (1). Alternatively, if the six (6) bytes of signaling, control, and/or stuff information 630, 632, 636, 638, 640 are sued, the 'Total SPE bytes used' equals seven hundred seventy-four (774). The 'payload capacity' equals seven hundred seventy-four (774). Therefore, 'transport efficiency' equals one hundred percent (100%). see Equation (1).

A person skilled in the art will appreciate that a method similar to that shown in FIGS. 4A-4C can be used to fill the SONET SPE 600 with bytes of information. Specifically, the bytes of payload information 650, 652, 654, 656, 658, 660 can be mapped to the SONET SPE 600 in a byte by byte manner. The cells of the SONET SPE 600 can be filled from top to bottom in a manner proceeding row by row, from left to right in each row. The counters 122, 124, 126, 128, 130 can be set, re-set, and incremented in a manner similar to that described above (in relation to FIGS. 4A-4C).

A person skilled in the art will appreciate that the format of a SONET SPE 600 is one embodiment of a SONET SPE format. However, the invention is not limited in this regard and any other SONET SPE format can be used without limitation.

Figure 7:
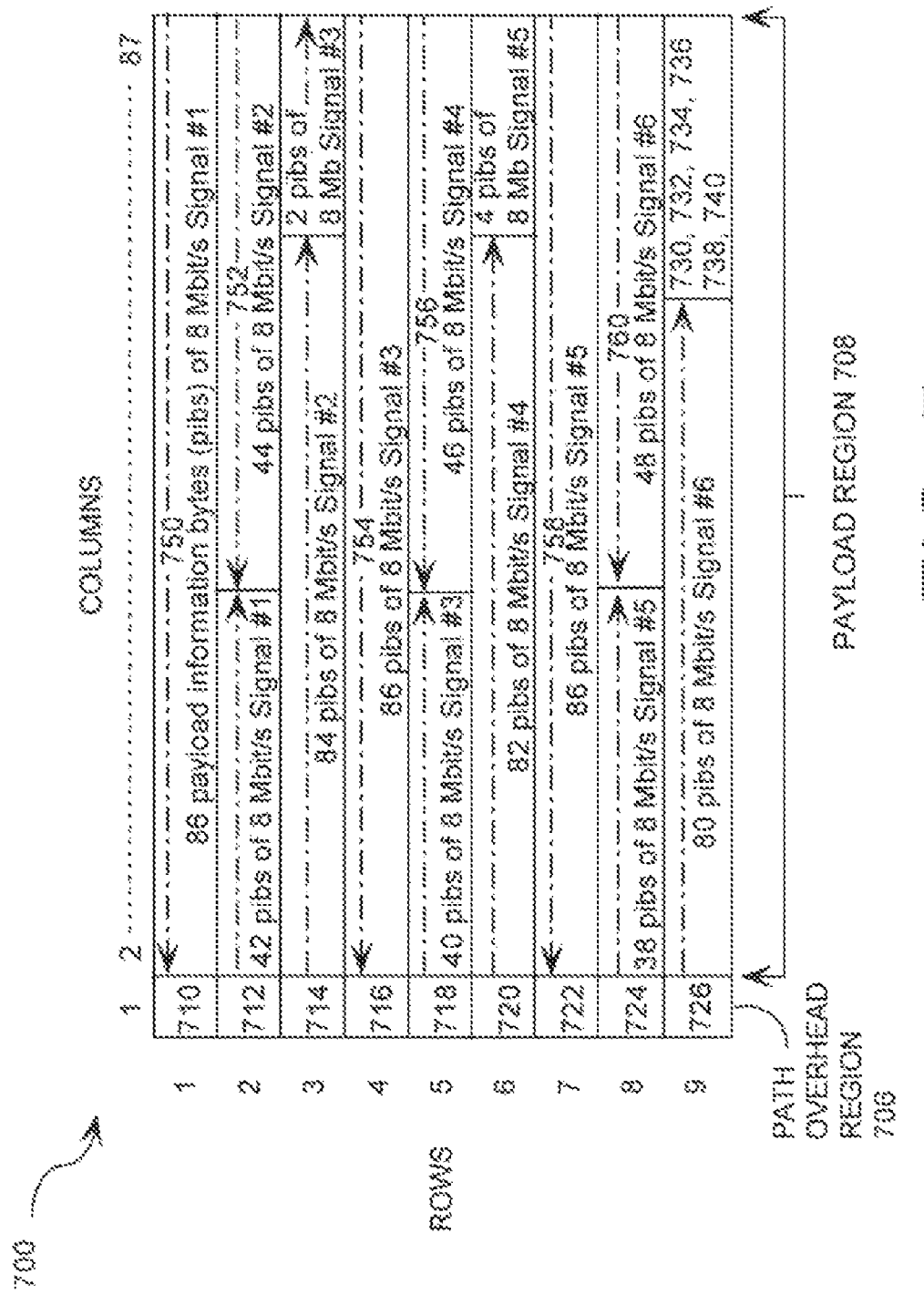
FIG. 7 is a format diagram of a SONET synchronous payload envelope that is useful for understanding the invention.

Referring now to FIG. 7, there is provided a format diagram of a SONET SPE 700 that is useful for understanding the invention. As shown in FIG. 7, the SONET SPE 700 is comprised of a path overhead region 706 and a payload region 708. The path overhead region 706 occupies the first column of the SONET SPE 700, thus includes nine bytes 710, 712, 714, 716, 720, 722, 724, 726 of path overhead data. The payload region 708 occupies eighty-six (86) columns by nine (9) rows of bytes. As shown in FIG. 7, the payload region 708 is comprised of seven hundred sixty-eight (86 columns×9 rows–6 bytes=768) bytes of payload information 750, 752, 754, 756, 758, 760 associated with six (6) eight (8) Mbit/s signal. In this regard, the payload region 708 includes one hundred twenty-eight (768 bytes/6 signals=128) bytes of payload information 750, 752, 754, 756, 758, 760 per eight (8) Mbit/s signal. The payload region 708 is also comprised of six (6) bytes of signaling, control, or stuff information 730, 732, 734, 736, 738, 740. It should be appreciated that the six (6) bytes of signaling, control, or stuff information 730, 752, 754, 756, 758, 760 associated with the six (6) eight (8) Mbit/s signals.

It should also be appreciated that the format of a SONET SPE 700 provides for a method to transport a plurality of eight (8) Mbit/s signals efficiently over the SONET based network 108. For example, if the six (6) bytes of signaling, control, and/or stuff information 730, 732, 734, 736 738, 740 are unused, the 'Total SPE bytes used' equals seven hundred sixty-eight (768). The 'payload capacity' equals seven hundred seventy-four (774). As such, the 'transport efficiency' equals ninety-nine point two percent (99.2%). see Equation (1). Alternatively, if the six (6) bytes of signaling, control, and/or stuff information 730, 732, 734, 736, 738, 740 are used, the 'Total SPE bytes used' equals seven hundred seventy-four (774). The 'payload capacity' equals seven hundred seventy-four (774). Therefore, the 'transport efficiency' equals one hundred percent (100%). see Equation (1).

A person skilled in the art will appreciate that a method similar to that shown in FIGS. 4A-4C can be used to fill the SONET SPE 700 with bytes of information. Specifically, the bytes of payload information 750, 752, 754, 756, 758, 760 can be mapped to the SONET SPE 700 in a byte by byte manner. The cells of the SONET SPE 700 can be filled from top to bottom is a manner proceeding row by row, from left to right in each row. The counters 122, 124, 126, 128, 130 can be set, re-set, and incremented in a manner similar to that described above (in relation to FIGS. 4A-4C).

A person skilled in the art will appreciate that the format of a SONET SPE 700 is one embodiment of a SONET SPE format. However, the invention is not limited in this regard and any other SONET SPE format can be used without limitation.

All of the apparatus, methods and algorithms disclosed and claimed herein can be made and executed without undue experimentation in light of the present disclosure. While the invention has been described in terms of preferred embodiments, if will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A system for transporting a plurality of payload signals efficiently over a SONET based network, comprising:
   a plurality of data input ports configured to receive said plurality of payload signals transmitted at a first data transfer rate, said plurality of payload signals comprising payload information;
   a plurality of signaling input ports configured to receive a plurality of signaling signals transmitted at a second data transfer rate different from the first data transfer rate, said plurality of signaling signals including signaling information; and
   at least one data processing circuit configured to map said plurality of payload signals and said plurality of signaling signals directly into a SONET SPE of a SONET STS-1 frame exclusive of virtual tributaries, said mapping achieved by
      transferring a plurality of bytes of said payload information in sequence from each of said plurality of payload signals,
      breaking said payload information into a plurality of byte segments, each byte segment comprising a predetermined number of bytes of said payload information, mapping said plurality of byte segments to said SONET SPE in a byte by byte manner into a plurality of cells of said SONET SPE proceeding row by row, in a left to right manner, and proceeding from top to bottom of said SONET SPE, inserting at least one stuff byte segment into said SONET SPE if any one of said plurality of data input ports is determined to be inactive, said stuff byte segment comprising said predetermined number of bytes;

inserting a plurality of bytes of path overhead data into a plurality of cells in rows one through nine, column one of said SONET SPE or at a SONET SPE starting location defined by at least one SONET transport overhead pointer byte, and inserting bytes of non-payload information into cells in at least one column of the SONET SPE other than said column one containing said plurality of bytes of path overhead data;

wherein said non-payload information is selected from the group comprising said signaling information, stuff information and control information, and said first and second data transfer rates are less than a third data transfer rate of said SONET STS-1 frame.

2. The system according to claim 1, wherein said at least one data processing circuit is further configured to insert in said SONET SPE immediately preceding each respective one of said plurality of byte segments a byte of said non-payload information.

3. The system according to claim 1, wherein said at least one data processing circuit is further configured to insert a plurality of bytes of said non-payload information after a first byte of said plurality of bytes of path overhead data.

4. The system according to claim 3, wherein said at least one data processing circuit is further configured to insert said plurality of bytes of said non-payload information into a plurality of cells in a row one, columns two through seven of said SONET SPE.

5. The system according to claim 1, wherein said at least one data processing circuit is further configured to insert in said SONET SPE immediately following each respective one of said plurality of byte segments a byte of said non-payload information.

6. The system according to claim 1, wherein said at least one data processing circuit is further configured to insert said plurality of bytes of said non-payload information into a last six cells of said SONET SPE.

7. The system according to claim 6, wherein said at least one data processing circuit is further configured to insert said plurality of bytes of said non-payload information into a plurality of cells in a row nine, columns eighty-two through eighty-seven of said SONET SPE.

8. The system according to claim 1, wherein said at least one data processing circuit is further configured to determine whether each of said plurality of said data input ports is active or inactive.

9. The system according to claim 8, wherein said at least one data processing circuit is further configured to insert at least one stuff byte into said SONET SPE if a data input port of any one of said plurality of data input ports is inactive.

10. The system according to claim 1, wherein each of said plurality of byte segments is comprised of one hundred twenty eight bytes of payload information.

11. The system according to claim 1, wherein said at least one data processing circuit is further configured to determine whether each signaling input port of said plurality of signaling input ports is active or inactive.

12. The system according to claim 11, wherein said at least one data processing circuit is further configured to transfer a plurality of bytes of said signaling information in sequence from each one of said plurality of signaling signals to obtain a signaling byte segment.

13. The system according to claim 12, wherein said at least one data processing circuit is configured to insert said signaling byte segment into said SONET SPE if a signaling input port of a corresponding one of said plurality of signaling input ports is active.

14. The system according to claim 11, wherein said at least one data processing circuit is further configured to insert a byte of stuff information into said SONET SPE if a signaling input port of a corresponding one of said plurality of signaling input ports is inactive.

15. A method for transporting a plurality of payload signals efficiently over a SONET based network, comprising:

receiving at a plurality of data input ports said plurality of payload signals transmitted at a first data transfer rate, said plurality of payload signals comprising payload information;

receiving at a plurality of signaling input ports a plurality of signaling signals transmitted at a second data transfer rate different from the first data transfer rate, said plurality of signaling signals including signaling information; and mapping said plurality of payload signals and said plurality of signaling signals directly into a SONET SPE of a SONET STS-1 frame exclusive of virtual tributaries, said mapping including:

transferring a plurality of bytes of said payload information in sequence from each of said plurality of payload signals and breaking said payload information into a plurality of byte segments, each byte segment comprising a predetermined number of bytes of said payload information;

mapping said plurality of byte segments directly into a SONET SPE of a SONET STS-1 frame in a byte by byte manner into a plurality of cells of said SONET SPE proceeding row by row, in a left to right manner, and proceeding from top to bottom of said SONET SPE;

inserting a plurality of bytes of path overhead data into a plurality of cells in rows one through nine, column one of said SONET SPE or at a SONET SPE starting location defined by at least one SONET transport overhead pointer byte; and inserting bytes of non-payload information into cells in at least one column of the SONET SPE other than said column one containing said plurality of bytes of path overhead data;

wherein said non-payload information is selected from the group comprising said signaling information, stuff information and control information, and said first and second data transfer rates are less than a third data transfer rate of said SONET STS-1 frame.

16. The method according to claim 15, further comprising inserting in said SONET SPE immediately preceding each respective one of said plurality of byte segments a byte of said non-payload information.

17. The method according to claim 15, further comprising inserting a plurality of bytes of said non-payload information after a first byte of said plurality of bytes of path overhead data.

18. The method according to claim 17, further comprising inserting said plurality of bytes of said non-payload information into a plurality of cells in a row one, columns two through seven of said SONET SPE.

19. The method according to claim 15, further comprising inserting in said SONET SPE immediately following each respective one of said plurality of byte segments a byte of said non-payload information.

20. The method according to claim 15, further comprising inserting said plurality of bytes of said non-payload information into a last six cells of said SONET SPE.

21. The method according to claim 20, further comprising inserting said plurality of bytes of said non-payload information into a plurality of cells in a row nine, columns eighty-two through eighty-seven of said SONET SPE.

22. The method according to claim 15, further comprising determining whether each data input port of a plurality of data input ports is active or inactive.

23. The method according to claim 22, further comprising inserting at least one stuff byte into said SONET SPE if a data input port of any one of said plurality of data input ports is inactive.

24. The method according to claim 15, further comprising selecting each of said plurality of byte segments to include one hundred twenty eight bytes of payload information.

25. The method according to claim 15, wherein each of said plurality of signaling signals respectively corresponds to one of said plurality of payload signals.

26. The method according to claim 25, further comprising determining whether each signaling input port of a plurality of signaling input ports is active or inactive.

27. The method according to claim 26, further comprising transferring a plurality of bytes of said signaling information from each of said plurality of signaling signals to obtain a signaling byte segment.

28. The method according to claim 27, further comprising inserting said signaling byte segment into said SONET SPE if a signaling input port of said plurality of signaling input ports is active.

29. The method according to claim 26, further comprising inserting a byte of stuff information into said SONET SPE if a signaling input port of said plurality of signaling input ports is inactive.

30. A method for transporting a plurality of 8 Mbit/s payload signals efficiently over a SONET based network, comprising:
  receiving, at each of six data input ports, one of six 8 Mbit/s payload signals transmitted at a first data transfer rate of eight megabits per second, each of said 8 Mbit/s payload signals comprising payload information;
  receiving, at each of a plurality of signaling input ports, one of a plurality of signaling signals transmitted at a second data transfer rate different from the first data transfer rate, each signaling signal of said plurality of signaling signals including signaling information;
  mapping said plurality of payload signals and said plurality of signaling signals directly into a SONET SPE of a SONET STS-1 frame exclusive of virtual tributaries, said mapping including:
    transferring a plurality of bytes of said payload information in sequence from each of said 8 Mbit/s payload signals and breaking said payload information into a plurality of byte segments, each byte segment comprising 128 bytes of said payload information;
    mapping said plurality of byte segments directly into a SONET SPE of a SONET STS-1 frame in a byte by byte manner into a plurality of cells of said SONET SPE proceeding row by row, in a left to right manner, and proceeding from top to bottom of said SONET SPE;
    inserting a plurality of bytes of path overhead data into a plurality of cells in rows one through nine, column one of said SONET SPE or at a SONET SPE starting location defined by at least one SONET transport overhead pointer byte; and
    inserting six bytes of non-payload information into cells in at least one column of said SONET SPE other than said column one containing said plurality of bytes of path overhead data;
  wherein said non-payload information is selected from the group comprising said signaling information, stuff information and control information, and said first and second data transfer rates are less than a third data transfer rate of said SONET STS-1 frame.

* * * * *